US010633033B1

(12) United States Patent
Salter et al.

(10) Patent No.: US 10,633,033 B1
(45) Date of Patent: Apr. 28, 2020

(54) VEHICLE GRILLE DRAWER

(71) Applicant: FORD GLOBAL TECHNOLOGIES, LLC, Dearborn, MI (US)

(72) Inventors: Stuart C. Salter, White Lake, MI (US); David Brian Glickman, Southfield, MI (US); Mark A. Wisneski, Dearborn, MI (US); Paul Kenneth Dellock, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 43 days.

(21) Appl. No.: 16/173,338

(22) Filed: Oct. 29, 2018

(51) Int. Cl.
*B60R 9/06* (2006.01)
*B62D 25/12* (2006.01)
*E05F 15/662* (2015.01)
*B60R 11/02* (2006.01)
*B60Q 3/30* (2017.01)

(52) U.S. Cl.
CPC ............... *B62D 25/12* (2013.01); *B60Q 3/30* (2017.02); *B60R 9/065* (2013.01); *B60R 11/0235* (2013.01); *E05F 15/662* (2015.01); *E05Y 2900/536* (2013.01); *E05Y 2900/548* (2013.01)

(58) Field of Classification Search
CPC ....... B62D 25/12; B60Q 3/30; B60R 11/0235; B60R 9/065; E05F 15/662; E05Y 2900/548; E05Y 2900/536
USPC ...................................................... 296/193.11
See application file for complete search history.

(56) References Cited

U.S. PATENT DOCUMENTS 3,270,267 A * 8/1966 Nolte, Jr. ............. H01R 13/633 320/138
3,933,385 A * 1/1976 Sanford .................. B60R 19/26 293/136
4,829,223 A * 5/1989 Broberg ................ H02J 7/0045 320/105
5,150,939 A * 9/1992 Simin .................. B60Q 1/2692 280/166
5,919,048 A * 7/1999 Slattery ................ H01R 13/447 439/34
6,474,715 B2 * 11/2002 Fukushima ............... B60R 5/04 296/37.1
7,127,332 B2 10/2006 Strohmeier et al.
8,356,852 B2 1/2013 Lucas et al.
8,573,660 B2 * 11/2013 Cha ......................... B60R 19/48 224/489
9,409,525 B2 8/2016 Gillam et al.
9,963,089 B2 * 5/2018 Torrey, Jr. ............ B60R 13/105
(Continued)

FOREIGN PATENT DOCUMENTS

DE 102005032643 A1 1/2007
DE 102013009168 A1 12/2013

OTHER PUBLICATIONS https://in.pinterest.com/pin/385057836882814104/.

*Primary Examiner* — Pinel E Romain
(74) *Attorney, Agent, or Firm* — David L. Coppiellie; MacMillan, Sobanski & Todd, LLC

(57) ABSTRACT

A vehicle and method of operating that includes a body structure having hood and front bumper, a grille, mounted between the hood and front bumper, including an opening, and a drawer mounted in the opening, slidable forward to an open position in front of the vehicle and rearward to a closed position within the vehicle. A controller may receive various inputs for controlling the operation of the drawer.

18 Claims, 3 Drawing Sheets

(56) References Cited

U.S. PATENT DOCUMENTS

| | | | | |
|---|---|---|---|---|
| 2001/0022450 | A1* | 9/2001 | Delavalle | B60R 5/041 296/37.1 |
| 2005/0140159 | A1* | 6/2005 | Barber | B60P 3/14 296/37.6 |
| 2015/0102627 | A1* | 4/2015 | Pickartz | B60L 11/1818 296/97.22 |
| 2015/0279131 | A1 | 10/2015 | Nespolo | |
| 2016/0144815 | A1* | 5/2016 | Harris | B60R 19/34 293/142 |
| 2017/0067279 | A1* | 3/2017 | Koestler | F16F 9/54 |
| 2018/0072254 | A1 | 3/2018 | Wymore | |

* cited by examiner

VEHICLE GRILLE DRAWER

BACKGROUND OF THE INVENTION

The present invention relates to a vehicle having a front trunk, with a grille in front of the trunk and more particularly to user access to items supported by the grille.

Some vehicles include a front trunk, which may be due to the engine being located other than under a hood at the front of the vehicle, or due to the vehicle operating as a battery electric, in which case there is no engine under the hood.

In particular vehicle models, there may be customer options for an engine-based powertrain (gasoline, diesel, etc.), a hybrid electric powertrain or a pure battery electric powertrain. Due to cost efficiency, esthetics and functionality, the overall shape of the vehicle front end and structure may be maintained for all of the various powertrain options. For such vehicles, a hood and engine compartment is needed to receive and support the engine for the engine driven configuration of the vehicle. However, for the battery electric powertrain, then, the area where the engine is typically located may act as a front trunk for storage since no engine is present. Ease of access to this front trunk area is desirable, as well as employing the grille, which no longer is located in front of an engine.

SUMMARY OF THE INVENTION

An embodiment contemplates a vehicle having a body structure including hood and front bumper, a grille, mounted between the hood and front bumper, including an opening, and a drawer mounted in the opening, slidable forward to an open position in front of the vehicle and rearward to a closed position within the vehicle.

An embodiment contemplates a method for operating a vehicle comprising: receiving a user input requesting opening of a drawer mounted in a grille at the front of the vehicle; and after receiving the request, automatically sliding the drawer forward through an opening in the grille.

An advantage of an embodiment is that essentially the same vehicle structure and front end look may be employed for various drivetrain configurations of a vehicle, while providing ease of access to a front trunk for a battery electric powertrain configuration of the vehicle. The ease of access to the front trunk is provided while also providing features that add to the functionality of the front vehicle area, particularly the grille mounted between the hood and front bumper.

DETAILED DESCRIPTION

Figure 1:
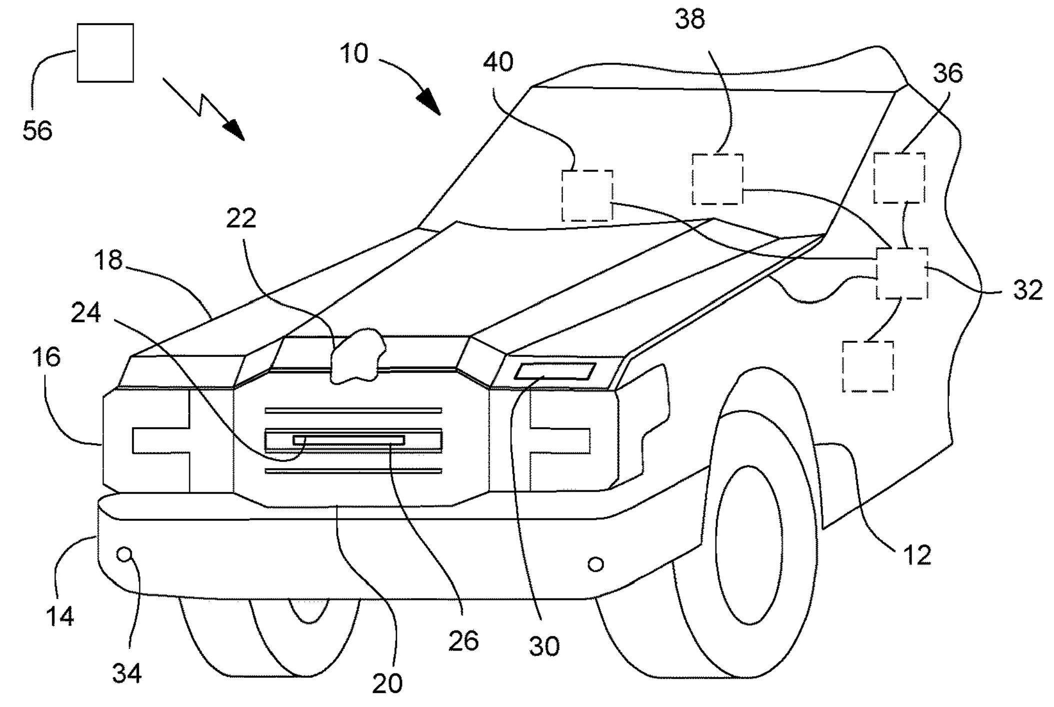
FIG. 1 is a schematic perspective view of a front end of a vehicle showing a grille between a hood and front bumper.
Figure 2:
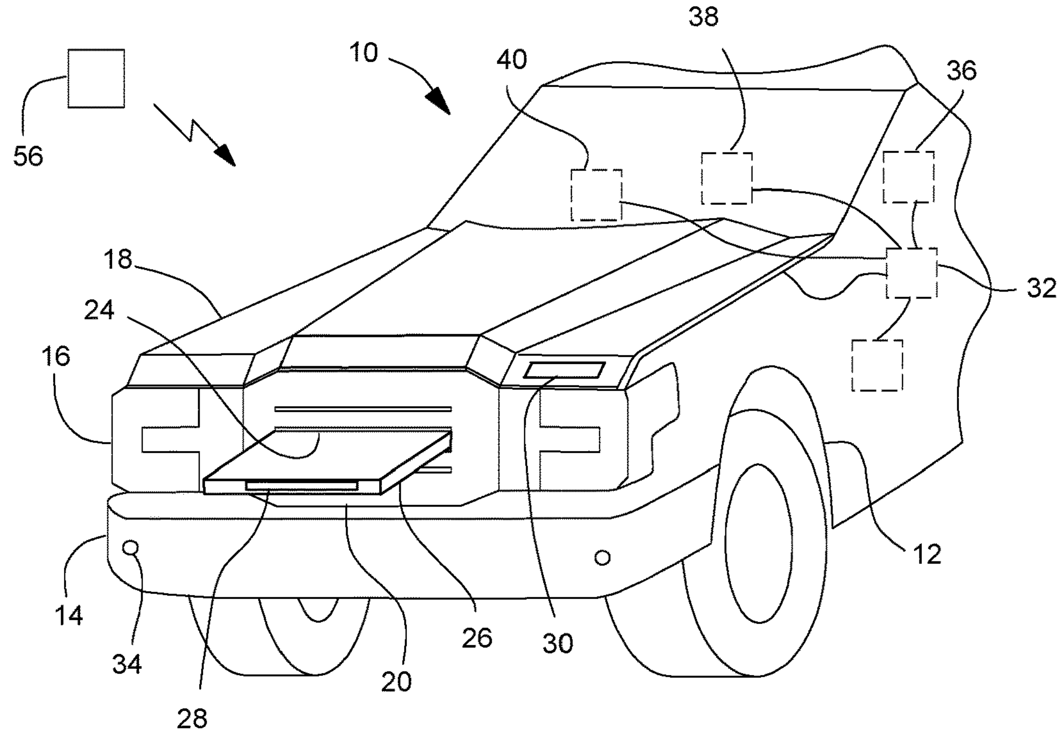
FIG. 2 is a schematic perspective view similar to FIG. 1 but with a drawer extending forward from the grille.
Figure 3:
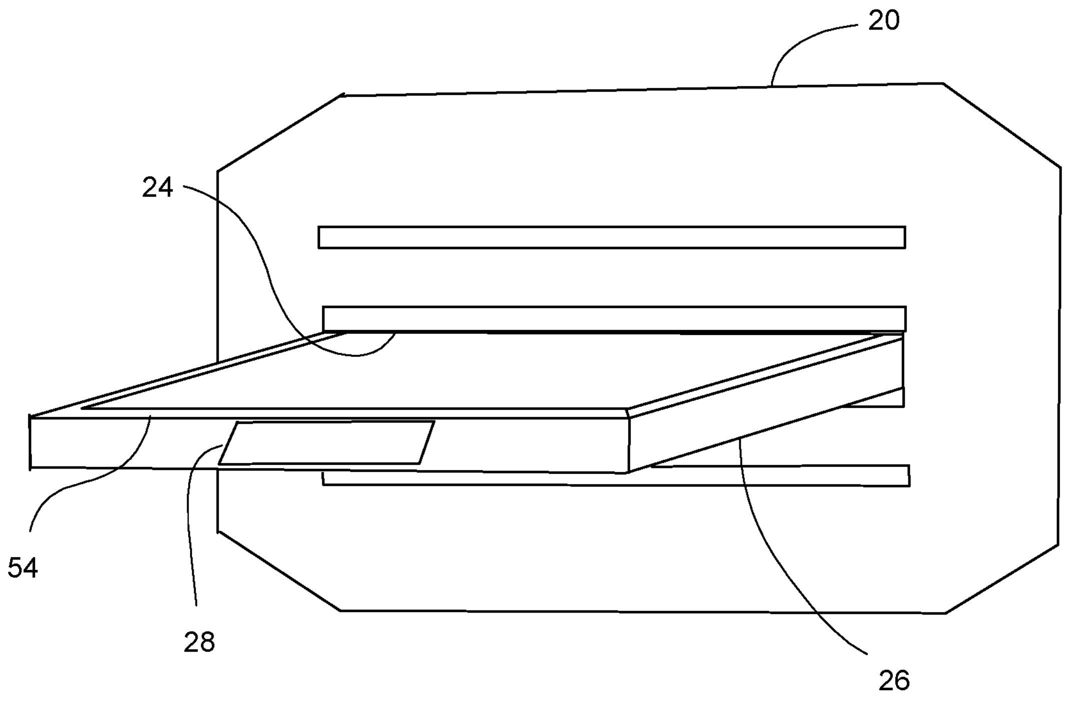
FIG. 3 is a schematic perspective view of the grille with the drawing extending forward from the grille.
Figure 4:
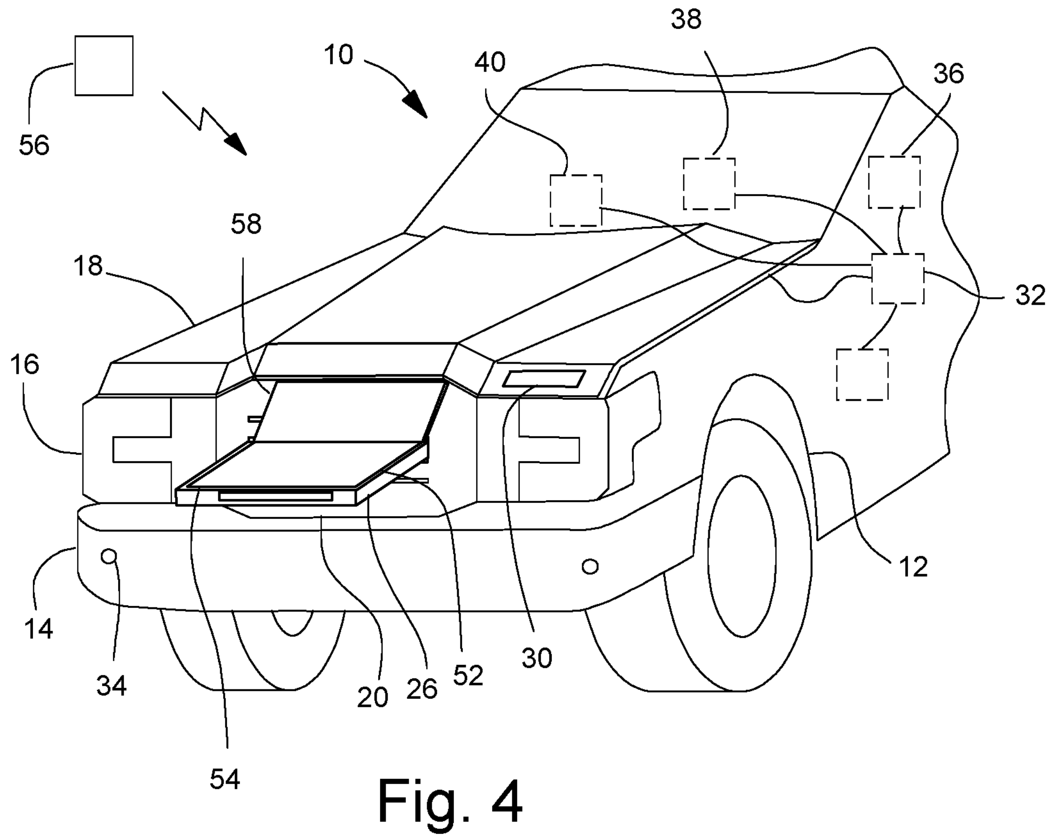
FIG. 4 is a schematic perspective view similar to FIG. 1 but with a drawer extending forward from the grille and a video display extending above the drawer.
Figure 5:
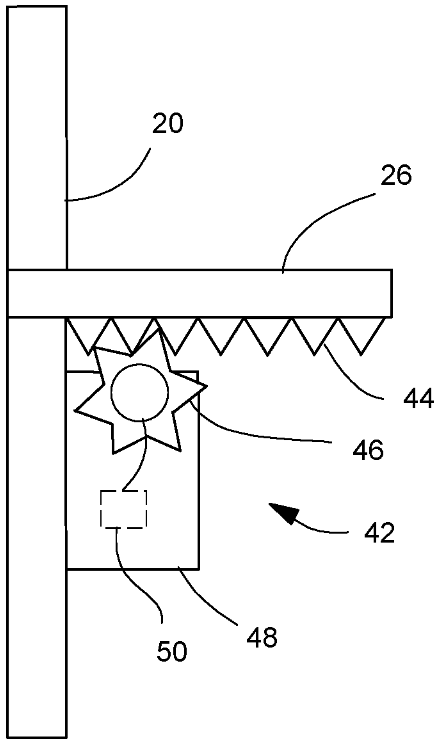
FIG. 5 is a schematic side view of an actuator and drawer mounted on the grille.
Figure 6:
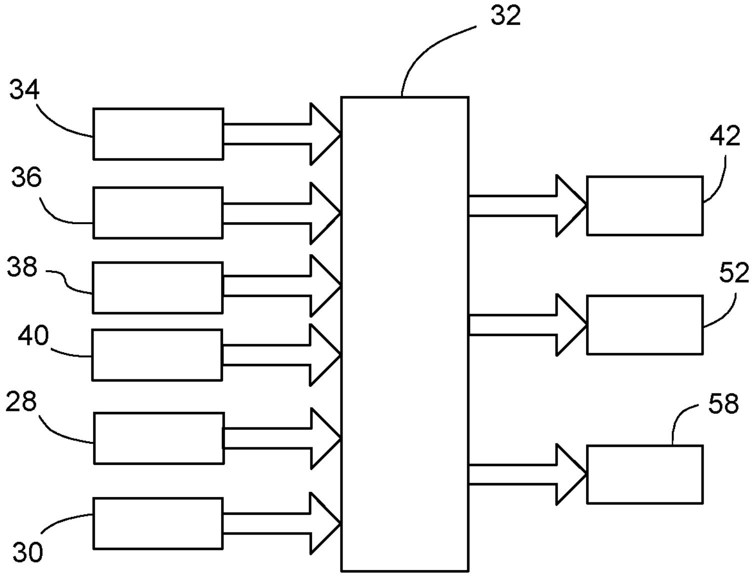
FIG. 6 is a schematic view illustrating inputs/outputs for a controller.

FIGS. 1-6 illustrate a vehicle 10 having front fenders 12, a front bumper 14, headlights 16, a hood 18 and a grille 20.

The vehicle 10 may be a pickup truck, although it may be a different type of vehicle if so desired.

The grille 20 may be sized and shaped to match a grille in an engine driven model of this vehicle in order to maintain the same look and allow for essentially the same front end vehicle body structure for both models. While the grille 20 may be configured to look the same as other models from outside of the vehicle 10, it may have a generally solid inner surface in order to keep water out of a front trunk 22 (shown in broken away view of FIG. 1) and provide other functionality. The solid inner surface may be feasible in this battery electric vehicle 10, rather than having perforations or openings, since no air flow is needed for engine cooling. The hood 18 may lift up to provide one means of access to the front trunk 22.

The grille 20 includes an opening 24 through which a drawer 26 slides forward to an open position (FIGS. 2-4) to provide access to the drawer 26 outside of the vehicle 10 and slides rearward into the front trunk 22 into a closed position (FIG. 1), in order to provide security and protection from the elements for the contents of the drawer 26. Optionally, the drawer 26, when closed, may have a front surface that is designed to blend into the grille 20 so as to not be noticeable to a casual passer-by.

The drawer 26 may include a keypad 28 mounted on the front of the drawer 26. This may be, for example, a capacitive keypad that can sense a particular motion of a person, a keypad that allows for input of a sequence of numbers or other type of security feature that limits access to the drawer 26 opening. The motion activation (gesture) for closing the drawer 26 may be desirable for someone who does not wish to touch a front grille area that may be dirty. A body mounted touch screen or keypad 30 may be employed to allow for access, in addition to or alternatively to the drawer mounted keypad 28. Additionally, actuation of the drawer 26 may be via a button or touchscreen 38 internal to the vehicle 10, or through wireless means 56 such as for example a smart phone or a key fob.

A video display 58 may be mounted on top of the drawer 26, being folded down for retraction of the drawer 26 into its closed position and pivoted to a generally vertical position when the drawer 26 is open. The video display, when pivoted upward may allow access to a keyboard. Optionally, the video display 58 may be configured to provide for automatic deployment as drawer 26 opens.

The keypads 28, 30, video display 58 (and other actuators) may be in communication with a controller 32. The controller 32 may be a separate control module or may be incorporated into a different vehicle controller such as, for example, a body control module, if so desired.

The controller 32 may include various inputs, such as for example ultrasonic sensors 34 mounted on the front of the vehicle 10, Bluetooth Low Energy (BLE) antennas 36 on the vehicle 10, a touch screen 38 in the vehicle interior, a forward looking camera 40, a remote wireless device 56 (such as a key fob or smart phone), the drawer keypad 28, and the body keypad 30. Advantageously, the ultrasonic sensors 34, BLE antennas 36, touch screen 38 and forward looking camera 40 may already be employed for other vehicle uses, thus no additional hardware would be needed to add the functionality provided by these devices to drawer opening/closing functions.

The output of the controller 32 may include an actuator 42 that selectively activates for moving the drawer 26 between open and closed positions. The actuator 42 may include, for example, a gear 44 mounted along an underside of the drawer 26 mating with a gear 46 mounted to an actuator housing 48 within the front trunk 22. The gear 46 may be driven by a motor 50 that is activated via the controller 32 for opening/closing the drawer 26. Another example of the actuator 42 may include a direct-drive type of screw jack, if so desired.

The output of the controller 32 may also include controlling a lighting system 52 mounted to the drawer 26 or adjacent to the drawer, if so desired. The lighting system 52 may include, for example, a light pipe 54 surrounding a portion of the drawer's periphery. The output of the controller 32 may also be in communication with the video display 58, although the video display may operate separately from and not be in communication with the controller 32, if so desired.

The combination of the movable drawer 26 and controller 32, with the vehicle inputs, then, provides for various types of convenience and security functions associated with the drawer 26. For example, the touch screen 38 may be employed to provide a one-time use code allowing someone to open the drawer 26 one time before that particular code expires, or may be employed to authorize particular BLE devices to operate the drawer 26.

Another example, may be the use of the camera 40 where, when sensing someone standing at the drawer 26 when open, the camera 40 may take a picture and store this image for a later security check, if so desired.

The lighting system 52 may be controlled by the controller 32 to provide convenience functions. The lighting system 52 may be automatically activated when the drawer 26 is moved to an open position. Additionally, the lighting system 52 may flash a particular color while the drawer 26 is opening/closing in order to indicate to a user that the motion is about to or is occurring. Also, the lighting system 52 may be employed to illuminate the keypad 28 in order to assist a user in operating the keypad 28, if so desired.

Other convenience functionality may include various ways of detecting when to automatically close the drawer 26. For example, the drawer 26 may automatically close when a person pushes on drawer 26 in the closing direction, a particular gesture is made by a person in front of the keypad 28, when a particular wireless device 56 (e.g., key fob or smart phone) moves more than a predetermined distance from the drawer 26 for longer than a predetermined time, or if no motion is detected by sensors (e.g., ultrasonic sensors 34) in front of the drawer 26 for a predetermined amount of time.

While certain embodiments of the present invention have been described in detail, those familiar with the art to which this invention relates will recognize various alternative designs and embodiments for practicing the invention as defined by the following claims.

The invention claimed is:

1. A vehicle comprising:

a body structure including hood and front bumper;

a grille, mounted between the hood and front bumper, including an opening; and a drawer mounted in the opening, slidable forward to an open position in front of the vehicle and rearward to a closed position within the vehicle.

2. The vehicle of claim 1 further including an actuator configured to slide the drawer.

3. The vehicle of claim 1 further including a video display pivotally mounted relative to the drawer.

4. The vehicle of claim 1 further including a lighting system mounted to the drawer.

5. The vehicle of claim 4 wherein the lighting system is configured to change color of light when the drawer is sliding in or out of the grille.

6. The vehicle of claim 1 wherein the drawer includes a user interface device mounted to a front surface thereof and configured to activate the drawer to move between the open and closed positions.

7. The vehicle of claim 1 further including a user interface device mounted to the body structure and configured to activate the drawer to move between the open and closed positions.

8. The vehicle of claim 1 further including a vehicle mounted camera configured to take a picture of one standing in front of the drawer when in the open position.

9. The vehicle of claim 1 further including vehicle mounted sensors configured to move the drawer to the closed position when no motion is detected in front of the vehicle for a predetermined time.

10. The vehicle of claim 1 further including a wireless device in communication with a vehicle controller and configured to move the drawer to the closed position when the wireless device moves more than a predetermined distance from the vehicle for greater than a predetermined amount of time.

11. A method for operating a vehicle comprising:

receiving a user input requesting opening of a drawer mounted in a grille at a front of the vehicle; and after receiving the request, automatically sliding the drawer forward through an opening in the grille.

12. The method of claim 11 further including:

automatically pivoting a video display upward from the drawer when the drawer is in an open position.

13. The method of claim 11 further including:

automatically activating a lighting system mounted to the drawer as the drawer moves from a closed position behind the grille to an open position extending forward from the grille.

14. The method of claim 13 wherein the lighting system changes color of the light when the drawer is moving between the open and closed positions.

15. The method of claim 11 wherein the user input is mounted to a front surface of the drawer.

16. The method of claim 11 further including:

taking a picture with a vehicle mounted camera of a user standing in front of the drawer when the drawer is in an open position.

17. The method of claim 11 further including:

automatically closing the drawer after detecting no motion in front of the vehicle for a predetermined time.

18. The method of claim 11 further including:

automatically closing the drawer after detecting that a wireless device moves more than a predetermined distance from the vehicle for greater than a predetermined time.

* * * * *